United States Patent Office 3,155,646
Patented Nov. 3, 1964

3,155,646
1 - ARABINOFURANOSYL - 5 - HALOURACIL AND PROCESS FOR THE PREPARATION THEREOF
James H. Hunter, Kalamazoo, Mich., assignor to The Upjohn Company, Kalamazoo, Mich., a corporation of Delaware
No Drawing. Filed Aug. 23, 1960, Ser. No. 51,301
9 Claims. (Cl. 260—211.5)

This invention relates to novel compounds and to a process for preparing them. More particularly, the invention is directed to 1-arabinofuranosyl-5-halouracil nucleosides and to a process for preparing them. Still more particularly, the invention relates to 1-β-D-arabinofuranosyl-5-halouracil nucleosides having the following structural formula:

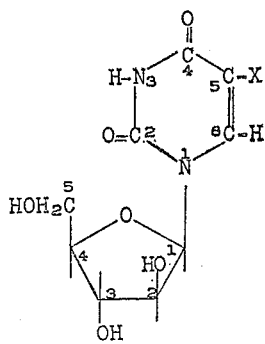

wherein X is halogen.

The novel 1-arabinofuranosyl-5-halouracil nucleosides of this invention are antimetabolites, and they are active against viruses, fungi, and bacteria. The novel 1-arabinofuranosyl-5-halouracil nucleosides can be used for preventing or controlling epizootics of viral and bacterial etiology in mammals and birds, and they are useful as intermediates in the preparation of the corresponding nucleotides by phosphorylation, for example, by condensation with phosphoric acid in the presence of yeast enzymes according to the method described in U.S. Patent 2,844,514. The 1-β-D-arabinofuranosyl - 5 - halocuracil nucleosides are preferred compounds of the invention, and they are useful in the treatment of influenza A virus infections in colonies of laboratory mice, in the treatment of influenza in swine, in the treatment of Newcastle's disease in poultry, in the treatment of canine and feline distemper, and for like diseases. Illustratively, the novel 1-β-D-arabinofuranosyl-5-iodouracil of this invention is an effective antiviral agent; it is active against influenza A (PR-8) and western equine encephalomyelitis viruses.

The novel 1-arabinofuranosyl-5-halouracil nucleosides of this invention are prepared by direct halogenation of a 1-arabinofuranosyluracil. Illustratively, 1-arabinofuranosyl-5-chloro-, 1-arabinofuranosyl-5-bromo-, and 1-arabinofuranosyl - 5 - iodouracil are prepared by direct halogenation, advantageously, by reacting 1-arabinofuranosyluracil with, respectively, chlorine, bromine, and iodine in the presence of an inert solvent which can be aqueous or non-aqueous. In general, selection of the inert solvent depends on the particular halogen, as will be readily apparent to those skilled in the art. Illustratively, chlorination can be carried out advantageously in the presence of a non-aqueous solvent, for example, a mixture of acetic acid and carbon tetrachloride; bromination in the presence of water alone; and iodination in the presence of water, an organic solvent, for example, chloroform, and an oxidizing agent, for example, nitric acid. If desired, the reaction can be accelerated by gently heating the reaction mixture. The 1-arabinofuranosyl-5-halouracil thus produced is then recovered by conventional methods, e.g., by removing excess halogen, evaporating the volatile components of the reaction mixture, solvent extraction, and crystallization; and like procedures.

If desired, direct halogenation can be carried out with a poly-O-acylated 1-arabinofuranosyluracil, for example, 1-(2,3,5-tri-O-acetyl-β-D-arabinofuranosyl)uracil and the like. The resulting poly-O-acylated 1-arabinofuranosyl-5-halouracil is then deacylated by hydrolysis, advantageously by acid hydrolysis, in order to obtain the desired 1-arabinofuranosyl-5-halouracil. When this procedure is used, the hydroxyl groups of the 1-arabinofuranosyluracil are blocked with the acyl group of a monocarboxylic acid, advantageously, a hydrocarbon carboxylic acid containing from 2 to 8 carbon atoms, inclusive. Acylation of a 1-arabinofuranosyluracil is accomplished by reaction with the acid anhydride or the acid chloride of a monocarboxylic acid such as, for example, acetic anhydride, acetyl chloride, or benzoyl chloride, and like acylating agents, advantageously in the presence of an acid acceptor, for example, pyridine, picoline, collidine, triethylamine, and the like.

Suitable such acids include saturated and unsaturated straight or branched chain aliphatic carboxylic acids such as acetic, propionic, butyric, isobutyric, tert-butyl-acetic, valeric, isovaleric, caproic, caprylic, and the like; and aromatic carboxylic acids such as benzoic, toluic, ethylbenzoic, phenylacetic and the like.

The 1-β-D-arabinofuranosyl-5-halouracil nucleosides of this invention can also be prepared, advantageously, by preparing a 1-β-D-ribofuranosyl-5-halouracil and then converting it to the corresponding arabinofuranoside by epimerization. 1-β-D-ribofuranosyl-5-halouracil is conveniently prepared by the method of Fox et al., J. Am. Chem. Soc. 78, 2117 (1956), by condensing a mercuric complex of 5-halouracil, e.g., di-5-fluorouracil mercury, and the like with, for example, a 2,3,5-tri-O-benzoyl-D-ribofuranosyl halide. The thus formed 1-(2,3,5-tri-O-benzoyl-β-D-ribofuranosyl)-5-halouracil is debenzoylated to obtain a 1-β-D-ribofuranosyl-5-halouracil, which is then converted to the corresponding 1-β-D-arabinofuranosyl-5-halouracil by epimerization according to the method of Brown et al., J. Chem. Soc., (1956), p. 2388. The sequence of reaction steps and intermediates prepared during the epimerization process are as follows:

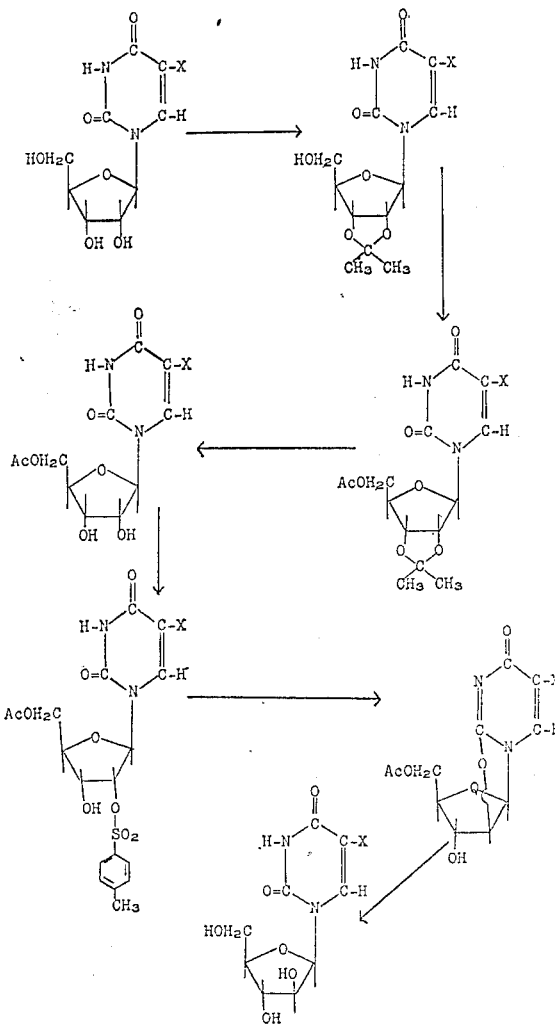

The 1-arabinofuranosyl-5-halouracil nucleosides of this invention form salts with bases, and it will be understood that this invention includes salts obtained by reacting a 1-arabinofuranosyl-5-halouracil with bases, e.g., alkali metal hydroxides, alkaline earth metal hydroxides, ammonia, non-toxic organic bases such as ethanolamine, and the like, to form pharmacologically acceptable salts.

The following examples are illustrative of the process and products of the present invention, but are not to be construed as limiting.

EXAMPLE 1.—PREPARATION OF 1-β-D-ARABINOFURANOSYL-5-CHLOROURACIL

A solution of 370 mg. (1.0 millimole) of 1-(2,3,5-tri-O-acetyl-β-D-arabinofuranosyl)uracil in 15 ml. of glacial acetic acid was mixed with 5 ml. of a 1.56% (w./v.) solution of chlorine in carbon tetrachloride (the 5 ml. contained about 78 mg. or 1.1 millimoles of chlorine). The reaction mixture was held at about 25° C. for 34 hrs. (external moisture was excluded). The volatile components were then removed by distillation at about 25° C. and 0.2 to 1.5 mm. of mercury pressure, and the material (a glass) thus obtained was held at 15 to 20 mm. of mercury pressure and about 25° C. for about 14 hrs. The glass was dissolved in warm absolute ethanol, and the ethanol was removed by codistillation (initially at a temperature of about 40° C. and 15 to 20 mm. of mercury pressure, and finally at a temperature of 40° to 55° C. and 0.2 to 0.3 mm. of mercury pressure). This codistillation with absolute ethanol was repeated. The amorphous 1-(2,3,5-tri-O-acetyl-β-D-arabinofuranosyl)-5-chlorouracil thus obtained was dissolved in 10 ml. of absolute methanol and 200 mg. of dry hydrogen chloride was added. The reaction vessel was stoppered securely, and it was held at about 25° C. for 18.5 hrs. The volatile components were partially removed by distillation at about 25° C. and 15 to 20 mm. of mercury pressure, and distillation was completed after raising the temperature to about 40° C. The white crystalline material thus obtained was held under reduced pressure at a bath temperature of about 40° C., and it was then powdered and triturated with acetone. The resulting white solid was collected on a filter; the filter cake was washed with acetone and dried in air. There was thus obtained 220 mg. of 1-β-D-arabinofuranosyl-5-chlorouracil having a melting point of 224° to 226° C. The product was dissolved in hot water and the aqueous solution was filtered through a bed of acid-washed filter aid (Celite). The filter was washed with hot water, and the combined filtrate and washings were allowed to cool. As the solution cooled, large rosettes of white needles began to form. The crystallizing mixture was held at about 25° C. for about 8 hrs. and refrigerated at 0° C. for about 12 hrs. The crystals of 1-β-D-arabinofuranosyl-5-chlorouracil were collected on a filter, washed with ice-water and dried in air. They weighed 218 mg. (78.5% yield) and had a melting point of 231° to 232° C.

Analysis:
  Calculated for $C_9H_{11}ClN_2O_6$—C, 38.79; H, 3.98; Cl, 12.72; N, 10.06.
  Found—C, 38.84; H, 3.93; Cl, 12.74; N, 10.23.

Optical rotation:
  $[\alpha]_D^{23°} +77°$ (c., 0.730 water).

Ultraviolet absorption:

$\lambda_{min.}^{0.1\,N\,HCl}$ 239 m$\mu$ ($A_M$ 1,345)  $\lambda_{max.}^{0.1\,N\,HCl}$ 276 m$\mu$ ($A_M$ 9,446)

$\lambda_{min.}^{0.1\,N\,NaOH}$ 248 m$\mu$ ($A_M$ 3,147)  $\lambda_{max.}^{0.1\,N\,NaOH}$ 275–276 m$\mu$ ($A_M$ 7,836)

Characteristic infrared absorption frequencies (cm.$^{-1}$):
  OH/NH _____ 3340, 3270, 3150.
  Unsat. C—H ____ 3040, 3020.
  C=O/C=C _____ 1715, 1702, 1680, 1620.
  C=O/C=N _____ 1283, 1205, 1165, 1118, 1085, 1046, 1032, 1017.
  Arom. sub. _____ 800, 680.

$R_f$ 0.62 water-saturated n-butanol, descending), 0.83 (65% (v./v.) aqueous isopropanol-2-N HCl, descending).

EXAMPLE 2.—PREPARATION OF 1-β-D-ARABINOFURANOSYL-5-BROMOURACIL

A quantity (448 mg., 1.8 millimoles) of finely divided 1-β-D-arabinofuranosyluracil was dissolved in 4 ml. of saturated bromine water. To the resulting clear solution was added 11 ml. of bromine water in portions of 1 ml. each. The reaction vessel was swirled after each addition. The reaction mixture which became yellow after adding the last portion of bromine water, was then swirled intermittently for 5 to 10 minutes; it was then decolorized by bubbling through it a slow stream of nitrogen gas. The colorless solution was chilled and concentrated to approximately one-half its original volume from a semi-frozen state under reduced pressure; it was then stored for about 14 hrs. at 15 to 20 mm. of mercury pressure. The volatile components were removed at about 30° C. and 0.2 to 0.5 mm. of mercury pressure, and the residue was mixed with 15 ml. of absolute ethanol and refluxed for approximately 15 minutes. The mixture was cooled and then refrigerated at −20° C. A crystalline solid that separated was collected on a filter, washed with cold absolute ethanol and dried in air. The crude 1-β-D-arabinofuranosyl-5-bromouracil thus obtained weighed 440 mg.; it was dissolved in hot 95% ethanol and the solution was sitrred with decolorizing charcoal. The suspension was filtered, and 200 mg. of crystalline 1-β-D-arabinofuranosyl-5-bromouracil was obtained from the filtrate.

Analysis:
  Calculated for $C_9H_{11}BrN_2O_6$—C, 33.45; H, 3.43; Br, 24.73; N, 8.67.
  Found: C, 33.59; H, 3.55; Br, 23.95; N, 8.53.
Optical rotation:
  $[\alpha]_D^{23°} +49°$ (c., 0.400 water).
Ultraviolet absorption:

$\lambda_{min.}^{0.1\ N\ HCl}$ 243 m$\mu$ ($A_M$ 1,459)   $\lambda_{max.}^{0.1\ N\ HCl}$ 278–279 m$\mu$ ($A_M$ 9,303)

$\lambda_{min.}^{0.1\ N\ NaOH}$ 250 m$\mu$ ($A_M$ 2,713)   $\lambda_{max.}^{0.1\ N\ NaOH}$ 277–278 m$\mu$ ($A_M$ 6,482)

Characteristic infrared absorption frequencies (cm.$^{-1}$):
  OH/NH _____ 3340, 3280, 3210, 3160.
  Unsat. C—H _____ 3050, 3000.
  C=O/C=N _____ 1715 sh., 1700, 1675, 1667.
  C=C _____ 1613.
  C—O/C—N _____ 1308, 1282, 1080, 1073, 1050, 1030, 1014.
  Arom. sub. _____ 855, 798, 772, 740, 680.
  $R_f$ 0.51 (water - saturated n-butanol, descending), 0.86 (65% (v./v.) aqueous isopropanol-2 N HCl, descending).

EXAMPLE 3.—PREPARATION OF 1-β-D-ARABINOFURANOSYL-5-IODOURACIL

A mixture consisting of 448 mg. (1.8 millimoles) of 1-β-D-arabinofuranosyluracil, 456 mg. (1.8 millimoles) of iodine, 2.5 ml. of chloroform, and 4.9 ml. of 1.0 N nitric acid was heated under gentle reflux for about 5 hrs. The reaction mixture was cooled, and then refrigerated at 0° C. The solids which separated were collected on a filter, washed extensively with ether, and dried in air. The crude product thus obtained weighed 560 mg. and had a melting point of 190° to 195° C., with previous softening. This crude product was dissolved in hot water, decolorizing charcoal was added, and the suspension was stirred and filtered. Crystallization occurred spontaneously, and was completed by refrigerating at 0° C. for about 18 hrs. The crystals of purified 1-β-D-arabinofuranosyl-5-iodouracil were collected on a filter, washed with ice-water and dried in air. They weighed 315 mg. and had a melting point of 196° to 199° C.
Analysis:
  Calculated for $C_9H_{11}IN_2O_6$—C, 29.20; H, 3.00; I, 34.29; N, 7.57.
  Found—C, 29.21; H, 2.80; I, 34.05; N, 7.56.
Optical rotation:
  $[\alpha]_D^{23°} +30°$ (c., 0.7396 water).
Ultraviolet absorption:

$\lambda_{min.}^{0.1\ N\ HCl}$ 246–248 m$\mu$ ($A_M$ 1,801)   $\lambda_{max.}^{0.1\ N\ HCl}$ 289–290 m$\mu$ ($A_M$ 7,752)

$\lambda_{min.}^{0.1\ N\ NaOH}$ 253 m$\mu$ ($A_M$ 2,225)   $\lambda_{max.}^{0.1\ N\ NaOH}$ 279–283 m$\mu$ ($A_M$ 5,083)

Characteristic infrared absorption frequencies (cm.$^{-1}$):
  OH/NH _____ 3400 sh., 3310, 3220 sh., 3060.
  C=O _____ 1685, 1675, 1663.
  C=C _____ 1607, 1480 sh.
  C—O _____ 1150, 1135, 1075 sh., 1065, 1038, 1022.
  Arom. sub. _____ 875, 808, 790, 710.
  $R_f$ 0.51 (water - saturated n-butanol, descending), 0.85 (65% (v./v.) aqueous isopropanol-2 N HCl, descending).

EXAMPLE 4.—PREPARATION OF 1-α-D-ARABINOFURANOSYL-5-IODOURACIL

Following the procedure of Example 3, but substituting 1-α-D-arabinofuranosyluracil for 1-β-D-arabinofuranosyluracil; 1-α-D-arabinofuranosyl-5-iodouracil was prepared.

EXAMPLE 5.—PREPARATION OF 1-β-D-ARABINOFURANOSYL-5-FLUOROURACIL

*Part A.—Preparation of 1-(2,3-O-Isopropylidene-β-D-Ribonfuranosyl)5-Fluorouracil*

A mixture consisting of 26.2 g. (0.1 mole) of 1-β-D-ribofuranosyl-5-fluorouracil, 49 g. of anhydrous cupric sulfate, 600 ml. of acetone, and 0.65 ml. of concentrated sulfuric acid was stirred and maintained at approximately 25° C., for 70 hrs. (external moisture was excluded). The reaction mixture was filtered and the filter cake was washed with acetone. The filtrate and washings were combined and 25 g. of calcium hydroxide was added. After stirring the suspension for 3 hrs., it was filtered, and the filter cake was washed repeatedly with acetone. After combining the filtrate and washings, the volatile components were evaporated, and 1-(2,3-O-isopropylidine-β-D-ribofuranosyl)-5-fluorouracil was recovered.

*Part B.—Preparation of 1-(5-O-Acetyl-2,3-O-Isopropylidine-β-D-Ribofuranosyl)-5-Fluorouracil*

A solution of 1-(2,3-O-isopropylidine-β-D-ribofuranosyl)-5-fluorouracil (prepared in Part A) in pyridine was treated with an excess of acetic anhydride. The reaction mixture was held at 20° to 25° C. for about 5 hrs. The mixture was cooled, methanol was added, and the volatile components were removed under reduced pressure at a bath temperature of about 50° C. The residual solid thus obtained was dissolved in absolute ethanol and the ethanol was removed under reduced pressure at a bath temperature of about 50° C. This codistillation procedure was repeated two times and the resulting 1-(5-O-acetyl - 2,3 - O - isopropylidine-β-D-ribofuranosyl)-5-fluorouracil was purified by crystallization from 50% (v./v.) aqueous ethanol.

*Part C.—Preparation of 1-(5-O-Acetyl-β-D-Ribofuranosyl)-5-Fluorouracil*

The 1-(5-O-acetyl-2,3-O-isopropylidine-β-D-ribofuranosyl)-5-fluorouracil (prepared in part B) was suspended in approximately 20 volumes of 70% (v./v.) aqueous acetic acid, and the suspension was heated at about 75° C. for about 5 hrs. The volatile components were then removed at 0.3 to 0.7 mm. of mercury pressure and a bath temperature of 70° C. The syrupy residue was dissolved in absolute ethanol, and the ethanol was removed under reduced pressure and a bath temperature about 70° C. This codistillation procedure was repeated, and the residual crude 1-(5-O-acetyl-β-D-ribofuranosyl)-5-fluorouracil was purified by crystallization from 95% ethanol.

*Part D.—Preparation of 1-(5-O-Acetyl-2-O-Tosyl-β-D-Ribofuranosyl)-5-Fluorouracil*

A solution of 3.04 g. (10 millimoles) of 1-(5-O-Acetyl-β-D-ribofuranosyl)-5-fluorouracil (prepared in Part C) in 20 ml. of pyridine was mixed with 1.9 g. (10 millimoles) of p-toluenesulfonyl chloride. The reaction vessel was stoppered securely, and held at 20° to 25° C. for 15 hrs. The mixture was chilled and methanol was added. The volatile components were removed at about 60° C. (initially at about 20 mm. of mercury pressure, and finally at about 0.5 mm. of mercury pressure). The material thus obtained was swirled with warm absolute ethanol and the ethanol was removed under reduced pressure at a bath temperature of 60° to 70° C. After trituration with warm absolute ethanol and refrigeration at 0° C., there was obtained 1-(5-O-acetyl-2-O-tosyl-β-D-ribofuranosyl)-5-fluorouracil.

*Part E.—Preparation of 1-(5-O-Acetyl-O², 2-Cyclo-β-D-Arabinofuranosyl)-5-Fluorouracil*

A mixture of 1-(5-O-acetyl-2-O-tosyl-β-D-ribofuranosyl)-5-fluorouracil (prepared in Part D) and an excess of sodium azide in 95% ethanol was heated under reflux for 6 hrs. in a stream of nitrogen (the escaping gases were bubbled through aqueous sodium hydroxide). The volatile components were then removed under reduced pressure at a temperature of about 70° C. The material thus obtained was triturated with hot acetonitrile and the acetonitrile was then removed at a bath temperature of about 70° C. (initially under 15 to 20 mm. of mercury pressure and finally under 0.5 mm. of mercury pressure). The 1-(5-O-acetyl-O²,2-cyclo-β-D-arabinofuranosyl)-5-fluorouracil was separated from any sodium p-toluenesulfonate by repeated extraction with boiling acetonitrile and evaporation of the acetonitrile.

*Part F.—Preparation of 1-β-D-Arabinofuranosyl-5-Fluorouracil*

A quantity (5.72 g., 0.02 mole) of 1-(5-O-acetyl-O²,2-cyclo-β-D-arabinofuranosyl)-5-fluorouracil was dissolved in 0.1 N sulfuric acid and the reaction mixture was heated on a steam bath for 3 hrs. The reaction mixture was cooled and made faintly alkaline to phenolphthalein with 0.1 N barium hydroxide. The precipitated barium sulfate was separated by centrifugation and the clear supernatant was adjusted to about pH 5 with a stream of carbon dioxide gas. The somewhat cloudy solution thus produced was filtered and the filtrate concentrated in a stream of air to about two-thirds of the original volume. The thus-precipitated barium carbonate was separated by filtration and the filtrate was evaporated to dryness at 0.3 mm. of mercury pressure and a bath temperature of 50° to 60° C. After grinding the resulting solid to a powder and drying under reduced pressure over phosphorous pentoxide, crystals of 1-β-D-arabinofuranosyl-5-fluorouracil were obtained by dissolving in hot methanol, concentrating the solution, and chilling.

I claim:

1. Compound selected from the group consisting of 1-arabinofuranosyl-5-halouracil and pharmacologically acceptable salts thereof.
2. Compound selected from the group consisting of 1-β-D-arabinofuranosyl-5-halouracil and pharmacologically acceptable salts thereof.
3. 1-β-D-arabinofuranosyl-5-halouracil wherein "halo" is a halogen having atomic weight between 35 and 127, inclusive.
4. 1-β-D-arabinofuranosyl-5-chlorouracil.
5. 1-β-D-arabinofuranosyl-5-bromouracil.
6. 1-β-D-arabinofuranosyl-5-iodouracil.
7. The process for preparing 1-arabinofuranosyl-5-halouracil which comprises reacting 1-arabinofuranosyluracil with a halogen in the presence of a solvent and recovering 1-arabinofuranosyl-5-halouracil.
8. The process for preparing 1-β-D-arabinofuranosyl-5-halouracil which comprises reacting 1-β-D-arabinofuranosyluracil with a halogen in the presence of a solvent and recovering 1-β-D-arabinofuranosyl-5-halouracil.
9. The process according to claim 8 wherein "halo" is a halogen having an atomic weight between 35 and 127, inclusive.

References Cited in the file of this patent
UNITED STATES PATENTS
2,885,396    Heidelberger _____ May 5, 1959

OTHER REFERENCES
Brown et al., Jr. of Chem. Soc. (London), July 1956, pp. 2388–2393.

UNITED STATES PATENT OFFICE
CERTIFICATE OF CORRECTION

Patent No. 3,155,646                          November 3, 1964

James H. Hunter

It is hereby certified that error appears in the above numbered patent requiring correction and that the said Letters Patent should read as corrected below.

Column 4, line 44, for "C=O/C=N" read -- C-O/C-N --.

Signed and sealed this 30th day of March 1965.

(SEAL)
Attest:

ERNEST W. SWIDER                      EDWARD J. BRENNER
Attesting Officer                       Commissioner of Patents